INVENTOR.
WENDELL I. EVANS

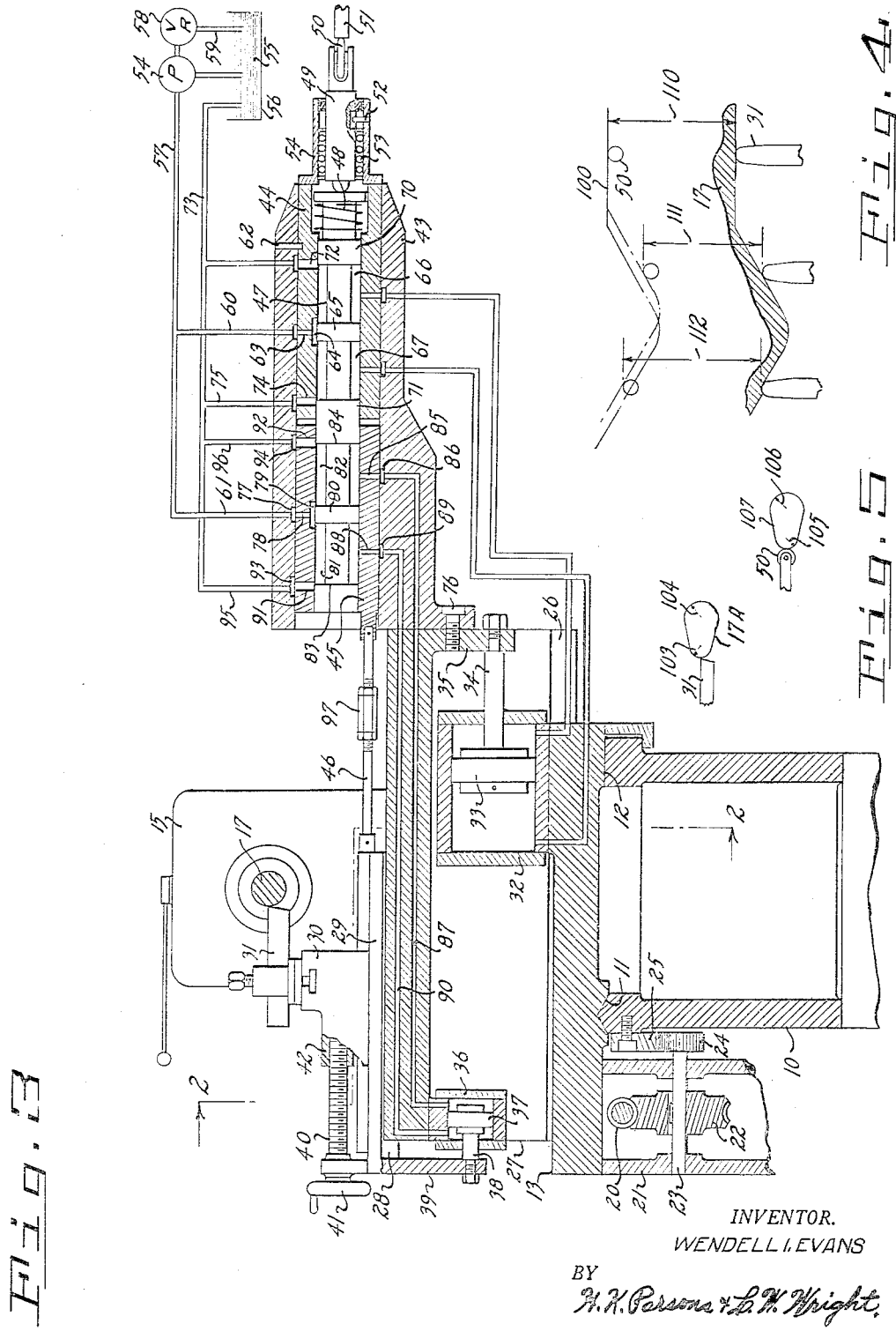

United States Patent Office 2,727,419
Patented Dec. 20, 1955

2,727,419

REPRODUCING MACHINE

Wendell I. Evans, Cincinnati, Ohio, assignor to The Cincinnati Milling Machine Co., Cincinnati, Ohio, a corporation of Ohio Application March 23, 1951, Serial No. 217,127

9 Claims. (Cl. 82—14)

This invention relates to improvements in reproducing machines and has particular reference to mechanism for automatic pattern control of the position of a cutting member with respect to the work piece being formed. At the present time reproducing machines utilizing pattern and tracer control for positioning of the tool are quite generally employed in connection with milling, turning, planing, and other operations and are capable of highly accurate reproduction results. Ordinarily, however, the accuracy of reproduction is dependent to an extent on the speed of operation, as the control is effected by imparting deflection or displacement to the tracer by the configuration or irregularities of the pattern to be reproduced, this deflection reacting, for example, through hydraulic valve control mechanism to effect relative shifting of the work piece and cutting tool. Due to the control deflection of the tracer and inherent mechanical lag or delay, even though minute, in the responsive movement of the tool there may be a variation between the exact movement of the tool with respect to the work as respects the movement of the contacting portion of the tracer with respect to the pattern.

As the relative speed of movement of the pattern and tracer increases or sharp deflections are imparted to the tracer at high rates, the tendency toward such a lag or lack of correspondence in position of the parts may increase due both to inertia and to the extent of displacement of a tracer control valve necessary to permit adequate quantity flow of the hydraulic actuating medium for producing the responsive movement of the cutting tool.

One of the objects of the present invention is to eliminate difficulties previously experienced and to provide a reproducing machine structure capable of extremely accurate pattern reproduction.

A further object of the invention is the provision of a tracer controlled reproducing machine structure which will insure rapid responsive movement of a tracer controlled part as respects pattern or otherwise effected tracer deflections.

An additional object of the present invention is the provision of an improved tracer control mechanism including means actuable upon tracer deflection for effecting general bodily relative movement of certain of the machine parts, together with a supplemental portion concomitantly effective to produce an initial compensatory or booster effect as respects the initial shifting of the parts to minimize relative positional displacement between the pattern movable tracer contactor and the contacting position of the tool with the work.

A further object of the invention is the provision in a tracer control mechanism of independent concurrently effective shifting means for varying the relative movement of a work piece and cutter in a selected direction in connection with a unitary tracer mechanism having portions movable simultaneously to control the effect of both positioning mechanisms.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 3 is a semi-diagrammatic transverse sectional view on the line 3—3 of Figure 2.

Figure 4 is a diagrammatic view illustrating the basic relationships of tool and tracer as respects work and pattern during employment of conventional tracer mechanisms, and Figure 5 is a diagrammatic view illustrating relationship of the parts of the present invention during the turning of cams or other irregular outlines requiring use of a rotary pattern.

Figure 1:
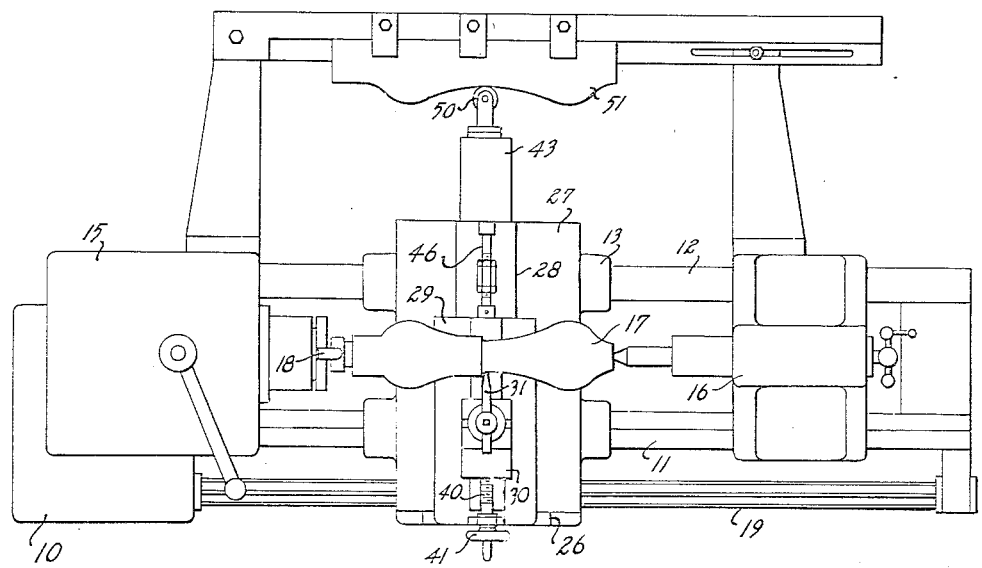
Figure 1 is a semi-diagrammatic plan view of one form of machine tool embodying the present invention.
Figure 2:
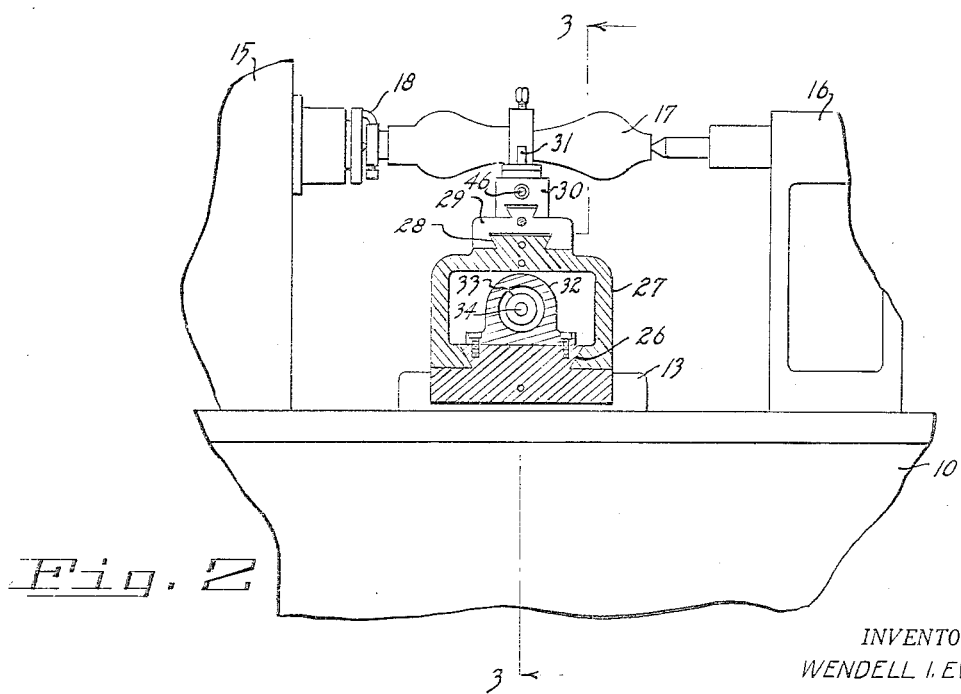
Figure 2 is a vertical sectional view thereof on the line 2—2 of Figure 3.

In the drawings the numeral 10 designates the bed of a lathe which has been selected as a characteristic machine tool with which the present invention can be utilized, it being understood that it is equally applicable for employment in connection with milling machines, planers, and other machine tools.

Mounted on the ways 11 and 12 of the bed is the lathe carriage 13 supporting the suitably driven headstock 15 and tailstock 16 between which is mounted the semifinished work piece 17 driven in conventional manner as by dog 18. Contained in the bed 11 is conventional drive mechanism, not shown, for the spline shaft 19 carrying a worm 20 mounted in and slidable with the apron 21 of carriage 13. This worm drives the worm gear 22 keyed on shaft 23 provided with pinion 24 meshing with the rack 25 secured to the front of the bed for effecting longitudinal feeding of the carriage 13.

The carriage 13 is provided with ways 26 for the cross slide 27 which is, in turn, provided with ways 28 for the supplemental adjustable slide 29 bearing the adjustable tool post holder 30 for the lathe tool 31.

To control the several movements of the parts just described there is secured to the carriage 13 a cylinder 32 containing piston 33 having a rod 34 secured to flange 35 of slide 27. Slide 27 is, in turn, provided with the cylinder 36 for piston 37 having its rod 38 secured to the bracket 39 mounted on the forward end of slide 29. Swiveled in the bracket 39 is an adjusting screw 40 having the pilot wheel 41, this screw being engaged in the nut portion 42 of the tool carrying member 30 for effecting adjustment of the tool with respect to the slide 29.

Mounted on the main cross slide 27 is the tracer housing 43 containing a fixed bushing or valve member 44 and an axially aligned slidable bushing or valve member 45, the latter being coupled by rod 46 with the tool slide 29 for movement therewith.

Slidably supported within the aligned bushings is a tracer valve member 47 urged toward the right as viewed in Figure 3 by a spring 48, its movement in this direction being limited and controlled by the plunger 49 provided with the pattern engaging contact 50 which, in the present instance, has been shown as a small roller riding on the pattern element 51. When the roller type contact is employed, it is positioned so that the periphery of the roller will properly track or ride against pattern 51, the member 49 being held for sliding but against rotary movement by the pin or key 52 while the balls 53 facilitate free axial sliding movement of the member 49 within the terminal extension 54 of the tracer.

The operation of the mechanism in question should be readily apparent by reference particularly to Figure 3 of the drawings in which there has been indicated the pump or source of hydraulic pressure medium 54 drawing pressure medium 55 from tank 56 and expelling it through the pressure supply line 57 at a pressure determined by the variable relief valve 58 which returns the excess to the tank through branch conduit 59. Pressure line 57 is divided into branches 60 and 61. It will be noted that the valve bushing 44 is secured against movement in the valve body or housing 43 by a pin 62 and that the branch 60 is connected through passage 63 in the member 44 to the distribution groove 64 which is opposed by the spool portion 65 or slidable first valve member on valve 47. As is conventional in tracer mechanisms, the groove 64 is preferably slightly greater in width than the spool 65, in this respect the size having been shown somewhat exaggerated in Figure 3, so that when the spool is in the centralized position shown there is an equalized pressure condition established through the orifice at each side between the wall of the spool and the distribution groove as respects the annular spaces 66 and 67 formed by the reduced portions of the valve at opposite sides of the spool. Extending from the space or area 66 is a conduit coupled with the right hand end cylinder 32. The opposite end of the cylinder is connected by the conduit system with the space 67. In this manner a balanced pressure reaction is created on opposite ends of the piston when the valve 47 is in its central or neutral position causing a stabilized location of the slide 27. The space 66 is bounded on the right by the shoulder 70 of the valve and the space 67 on the left by the shoulder 71 of the valve. In the centralized or neutral position shoulder 70 leaves port 72 slightly open, permitting flow into the return conduit 73 and likewise shoulder 71 leaves port 74 slightly open, permitting flow into the branch 75 of the return conduit. Any axial movement of the tracer valve 47 will tend to close down the aperture adjacent one of these shoulders while opening up the opposite aperture, thus increasing the pressure in one of the spaces and decreasing the pressure in the opposite space, the pressure differential thus created causing a movement of piston 33 in cylinder 32 and associated slide 27 in the direction of displacement of the valve to the extent necessary to reestablish the neutralizing position. The connection as at 76 between the slide 27 and the tracer head or housing 43 effects this feedback readjusting movement of the valve mechanism.

The pressure branch 61 discharges into primary distribution groove 77 and through port 78 in the sliding valve bushing 45 to the distribution groove 79, having a relationship to the valve spool or second tracer actuated valve member 80 similar to that described in connection with groove 64 and valve spool 65. Formed at opposite sides of the spool 80 by reduced portions of the valve member are the spaces 81 and 82 bounded by the valve shoulders 83 and 84. With the parts in their centralized or neutral position, as indicated in Figure 3, space 82 is connected through bushing port 85 and distribution groove 86 with the conduit 87 extending to the right hand end of cylinder 36 while space 81 is connected by valve port 88, distribution groove 89 with the conduit 90 connected with the opposite end of cylinder 36. The shoulders 83 and 84 control the flow of pressure medium by way of the bushing ports 91 and 92 through connected grooves 93 and 94 to the branches 95 and 96 of the general return conduit 73. Consequently, any displacement of the general "tracer valve" as by an eminence or depression on the pattern 51 engaging the tracer finger contact 50 will, by variance of the relationship between 80, 83, and 84 and their respective ports, vary the pressure conditions in cylinder 36, reacting on piston 37. As shown, the tracer valve is a unitary member moving as such and by its movement jointly controlling pressure conditions in the large or major cylinder 32 for effecting movement of the slide 27 in a direction corresponding to the direction of displacement of the "tracer valve," and at the same time creating a corresponding variation in the pressure conditions within cylinder 36, instituting an independent but directionally corresponding movement of the slide 29 both with and with respect to the slide 27.

It will particularly be noted that the cylinder 36 may be characterized as a minor or smaller cylinder since the effective cylinder and piston areas are much less than the areas of the corresponding parts 32—33. Under these circumstances, and as this minor cylinder is required to effect movement only of the ultimate light auxiliary slide much less volume of oil is required to produce this slide movement than is required to effect a corresponding distance of movement of the main slide 27. As a result, the movement of slide 29 responds with maximum sensitivity to very slight tracer determined displacements of the tracer valve so that there is practically zero lag between any slight shifting of the "tracer valve" and the tool 31. Any such slight shifting, however, immediately reacts upon the feedback connection 46 to produce a compensatory shifting of the sliding bushing or valve 45. As a result any displacement of the tracer contactor and tracer valve from neutral with respect to the main slide and tracer body causes an identical displacement of the tool 31 with respect to the slide 27, thus compensating for the pattern effected deflection of the tracer. Therefore, if the tracer remains deflected with its contact either nearer to or farther from the slide 27 than the neutral position, thus holding the contour control valve open, compensation is made by a shifting of the tool an amount corresponding to the amount of tracer displacement. Thus, the tool is maintained in constant accurate relation to the pattern for effecting proper reproduction thereof. To insure most accurate setting of 45 with respect to 30, 46 may be provided with a suitable adjustable connection, such as indicated at 97. It is to be particularly noted, however, that movement of the slide 29 and the valve portion or bushing 45 has, in itself, no effect as respects the movements of the main slide 27, and tracer head or housing 43 and fixed bushing 44 which are the supports for the sliding tracer valve.

Consequently, there is no feedback or restoring movement tending to shut off the pressure flow effected in cylinder 32 by displacement of the tracer valve until such time as the main slide has itself moved the distance dictated to the control valve by the configuration of the pattern. The movement of slide 27 will react, however, against the hydraulically locked piston 37, tending to cause a concomitant movement of the slide 30. This, in turn, reacts through connection 46 on the sliding bushing 45 moving this bushing in the same direction that the tracer valve has been displaced to create a balanced pressure condition within cylinder 36 on opposite sides of the piston 37, stopping the independent movement of the piston with respect to the slide 27. Continued movement of the slide 27 and thus of the tracer head or housing 43 for effecting a balanced pressure condition in the cylinder 32 as respects piston 33 in accordance with the positional dictation of the tracer valve will tend to effect additional movement of the bushing 45 in a direction opposite to that in which the tracer valve has been deflected with the result that a pressure condition effective in the opposite direction to that originally created by tracer valve deflection will be created in cylinder 36, recompensating for the initial movement imparted to the slide 30 to reestablish the initial relationship of slides 27 and 30 with the piston 37 in an intermediate position as illustrated in Figure 3. It will, therefore, be evident that the main adjusting stroke or major adjustment of the parts is always effected by movement of the piston 33, and it is unnecessary for piston 37 to have more than a very slight stroke or movement to take care of the initial reaction of tracer valve displacement as respects the cutting tool until such time as the main control can be taken over by movement of the slide 27 to the extent necessary to move the tracer valve housing until the tracer valve is restored to neutral position. It will be understood by those familiar with the art of tracer controlled surface reproductions that under ordinary operating conditions, the maximum movement of the tracer valve with respect to its support or housing is ordinarily in the nature of but a few thousandths of an inch maximum, and, dependent on sensitivity of the valve, may be appreciably less and that the port clearances illustrated in Figure 3 have been dimensionally exaggerated to facilitate visual understanding of the results produced.

Correspondingly shown in exaggerated outline in Figure 4 is an indication of the nature of the operation of prior art tracing mechanisms in which the line 100 represents the controlling surface of a pattern which is being followed by the tracer contact 50 to control the position of a tool 31 with respect to the work piece 17. In such prior art construction the tracer contact, as shown, being maintained against the pattern by spring 48 will follow the line 100, corresponding to the cutter path when in neutral. When the tracer is deflected by a rising portion of the pattern as indicated by the dotted line at the right of Figure 4, the tracer and tracer valve will move toward the tool or cutter 31. There is a tendency for a lag in response of the tool holding mechanism, and consequently, of the tool 31 to the tracer deflection, resulting, if the pattern is moving from the left to right, of a slight undercutting or additional stock removal by the tool while going uphill as indicated by the spacing between the right hand angled full line path corresponding to the cut surface shown on the work 17 and the parallel dot-dash line showing the path followed by the pattern deflected tracer and a corresponding slight overcutting or lag in stock removal indicated by the relative position of the full line and the dotted line at the left of Figure 4 when the parts are going downhill. The extent of this variation is dependent, of course, on the relative rapidity of movement of the parts and the sensitivity of the particular valve employed, it being understood that under ordinary conditions the greater the sensitivity the slower the inherent rate of movement available and the possible velocity for change of direction of movement of the tool and tracer. This is of particular importance, for example, in the type of operation diagrammatically indicated in Figure 5 in which the work piece 17a, there shown, has an eccentric or cam type profile in cross section, presenting a minor radius 103 and major radius 104 corresponding to the minor radius 105 and major radius 106 of the rotary pattern 107. The present invention, while advantageously employable in all instances, such for example as when following a plain profile or template pattern 51 or 100, as shown in Figures 1 and 4, is additionally advantageous under conditions such as shown in Figure 5 when sharp reversals are necessary during each revolution of the work piece and pattern.

The present invention tends to maintain constant the distance 110 between pattern and finished work surface indicated in Figure 4 and to eliminate a shortening of this distance due to lag as indicated at 111 in said figure, or an increase in the distance due to lag in the opposite direction as indicated by the dimension 112 of Figure 4.

From the foregoing it will be evident that there has been provided an improved tracer control mechanism and tracer controlled machine for most accurate reproduction of either template type or rotary patterns in which utilization is made of a single tracer device which, however, controls not only a main power operated slide for effecting tracer dictated movement of a cutting tool, but additionally controls a sensitive quick acting initial tool shifting mechanism effective for immediate response to initial tracer deflection, and in which the relationship of the parts and their cooperative action is such that a compensatory movement is imparted to one of the tool shifting means to restore and maintain the basic relationship of the tool and pattern contactor of the tracer irrespective of pattern controlled deflections or displacements of the pattern contactor of the tracer with respect to its main supporting slide.

What is claimed is:

1. A reproducing machine of the type embodying a first unit comprising a work holder and a pattern support, a second unit embodying a tool support and a tracer mechanism, together with means to effect relative movement of said units in one direction for traversing purposes and reciprocation in a second angularly related direction for contour determining purposes in which the contour determining means includes a first power cylinder and a second power cylinder both effective to produce reciprocation in said second direction, a source of hydraulic power, and means for controlling the coupling of said source of hydraulic power to the respective cylinders, said tracer mechanism including shiftable valve means, a first hydraulic circuit completable by way of said valve means to one of said cylinders, a second independent hydraulic circuit simultaneously completable by way of the said valve means to the other cylinder, means to vary the circuit reactions as respects one of said cylinders for a given displacement of the tracer valve, said means including a valve bushing individual to the circuit for said cylinder cooperating with the tracer valve, and an independent feed back connections from said one of the cylinders to said valve bushing.

2. A tracer deflection compensating mechanism for a reproducing machine of the type having a motor operated contouring slide, said compensating mechanism including an auxiliary slide carried by the contouring slide for movement in a common direction therewith and relative thereto in said same direction, drive connections including an auxiliary motor intervening the contouring and auxiliary slides for controlling their relative movement, a power source, a tracer body carried by the contouring slide and movable therewith, a first valve bushing supported by said tracer body, an auxiliary valve bushing slidable within the tracer body, a tracer actuable valve slidable within said bushings, said valve having flow controlling portions individual to the respective bushings, hydraulic circuits individual respectively to the motor of the contouring slide and to the auxiliary motor intervening the source of power and said motors and completable by way of the valve and bushings for simultaneously determining the actuation of the respective motors in accordance with movement of the valve, and means to adjust the position of the bushings with respect to each other within the tracer body to vary the circuit reactions effected by movement of the valve.

3. A tracer deflection compensating mechanism for a reproducing machine of the type having a motor operated contouring slide, said compensating mechanism including an auxiliary slide carried by the contouring slide for movement in a common direction therewith and relative thereto in said same direction, drive connections including an auxiliary motor intervening the contouring and auxiliary slides for controlling their relative movement, a power source, a tracer body carried by the contouring slide and movable therewith, a first valve bushing supported by said tracer body, an auxiliary valve bushing slidable within the tracer body, a tracer actuable valve slidable within said bushings, said valve having flow controlling portions individual to the respective bushings, hydraulic circuits individual respectively to the motor of the contouring slide and to the auxiliary motor intervening the source of power and said motors and completable by way of the valve and bushings for simultaneously determining the actuation of the respective motors in accordance with movement of the valve, and means to adjust the position of the bushings with respect to each other within the tracer body to vary the circuit reactions effected by movement of the valve, said means comprising an adjustable feed back connection intervening the auxiliary motor and one of said bushings.

4. A tracer control structure of the character described including a tracer valve housing, a first valve bushing carried by the housing, means securing the bushing in position within the housing, a second axially aligned valve bushing slidably mounted within the housing having ports formed therein, a positioning motor coupled with the housing for effecting variable positionings of the same, a source of power for the motor, a conduit system completable by way of the tracer valve and secured bushing for actuation of the motor, the tracer valve having spool portions individual to the first and to the second bushing for determining the reactions of the source of power on the motor as the valve is shifted, an auxiliary hydraulic motor mounted for movement with and with respect to the housing for determining the positioning of a tool support, and a connection between the auxiliary hydraulic motor and the sliding bushing whereby the operation of the auxiliary motor determines the positioning of the sliding bushing and additional spool means on the tracer valve individual to the ports of the sliding bushing and cooperating therewith variably to determine the coupling of the source of power with the auxiliary motor in accordance with displacement of the tracer valve with respect to the bushing.

5. A reproducing machine structure of the character described including a main slide, a hydraulic operating motor therefor, and an auxiliary tool carrying slide mounted on said main slide, a minor volume auxiliary hydraulic motor intervening said slides and variably operable to determine the movement of the auxiliary slide with and with respect to the main slide, a tracer support carried by the main slide, valve means carried by the tracer support including a valve slidable relative to the main slide and having portions individual respectively to the main and auxiliary motors for determining the operation of each of said motors, and feedback means intervening the auxiliary slide and the valve portion for the auxiliary motor to maintain a constant spacing on the main slide between the slidable valve and the auxiliary slide when the slidable valve is moved relative to the main slide to effect operation of the main slide motor.

6. A tracer controlled mechanism for accurate control of the movement of a tool toward and from a workpiece, including a main slide, a tracer body supported by the slide, a supplemental slide movable with and with respect to the main slide in a direction parallel to the direction of movement of the main slide, a first motor for moving the main slide, a tool holder carried by the supplemental slide, a second motor for moving the supplemental slide with respect to the main slide, a source of actuating medium, a tracer carried by the body and movable relative thereto, a tracer controlled valve in the valve body supported for movement by the tracer, said valve having a first portion for controlling the flow of said medium to the first motor and a second portion for controlling the flow of said medium to the second motor, a first tracer body valve portion movable with the tracer body and cooperating with one of said tracer valve portions to modify the tracer valve initiated flow of said medium to one of said motors, and a second tracer body valve portion movable both with and relative to the tracer body and cooperating with the other of said tracer valve portions independently to modify the flow to the other of said motors.

7. A tracer controlled mechanism for accurate control of the movement of a tool toward and from a workpiece, including a main slide, a tracer body supported by the slide, a supplemental slide movable with and with respect to the main slide in a direction parallel to the direction of movement of the main slide, a first motor for moving the main slide, a tool holder carried by the supplemental slide, a second motor for moving the supplemental slide with respect to the main slide, a source of actuating medium, a tracer carried by the body and movable relative thereto, a tracer controlled valve in the valve body supported for movement by the tracer, said valve having a first portion for controlling the flow of said medium to the first motor and a second portion for controlling the flow of said medium to the second motor, a first tracer body valve portion movable with the tracer body and cooperating with one of said tracer valve portions to modify the tracer valve initiated flow of said medium to one of said motors, a second tracer body valve portion movable both with and relative to the tracer body and cooperating with the other of said tracer valve portions independently to modify the flow to the other of said motors, and operating connections between the second slide and said second valve portion to control its movement.

8. A tracer controlled mechanism for accurate control of the movement of a tool toward and from a workpiece, including a main slide, a tracer body supported by the slide, a supplemental slide movable with and with respect to the main slide in a direction parallel to the direction of movement of the main slide, a first motor for moving the main slide, a tool holder carried by the supplemental slide, a second motor for moving the supplemental slide with respect to the main slide, a source of actuating medium, a tracer carried by the body and movable relative thereto, a tracer controlled valve in the valve body supported for movement by the tracer, said valve having a first portion for controlling the flow of said medium to the first motor and a second portion for controlling the flow of said medium to the second motor, a first tracer body valve portion movable with the tracer body and cooperating with one of said tracer valve portions to modify the tracer valve initiated flow of said medium to one of said motors, a second tracer body valve portion movable both with and relative to the tracer body and cooperating with the other of said tracer valve portions independently to modify the flow to the other of said motors, operating connections between the second slide and said second valve portion to control its movement, and means for varying the effective length of said connections to adjust the respective reactions of the tracer body valve portions.

9. A tracer controlled mechanism for accurate control of the movement of a tool toward and from a workpiece, including a main contouring slide, a tracer body supported by the slide, a supplemental slide supported by the main slide and movable with and with respect to the main slide in a direction parallel to the direction of movement of the main slide, a tool holder on the supplemental slide, a first motor for movement of the main slide, a second motor for relative movement of the slides, a source of actuating medium, a tracer carried by the body and moveable relative thereto, a tracer controlled valve in the valve body supported for movement by the tracer, said valve having a first portion for controlling the flow of said medium to the first motor, and a second portion for controlling the flow of said medium to the second motor, a first valve portion movable with the tracer body and cooperating with one of said tracer valve portions to modify the tracer valve initiated flow of said medium to one of said motors to position the contouring slide, and a second valve portion movable relative to the tracer body and cooperating with the other of said tracer valve portions independently to modify the flow to the other of said motors to effect a coincidental movement of the second tool holder slide relative to the tracer body in correspondence with the movement of the tracer with respect to said body.

References Cited in the file of this patent

UNITED STATES PATENTS

| | | |
|---|---|---|
| 1,957,759 | Coates et al. | May 8, 1934 |
| 2,011,086 | Shaw | Aug. 13, 1935 |
| 2,313,849 | Turchan et al. | Mar. 16, 1943 |
| 2,332,533 | Roehm | Oct. 26, 1943 |
| 2,375,831 | Turchan et al. | May 15, 1945 |
| 2,436,373 | Barnes | Feb. 24, 1948 |
| 2,474,134 | Waterson | June 21, 1949 |
| 2,562,284 | Tancred | July 31, 1951 |
| 2,601,345 | Turchan | June 24, 1952 |